United States Patent
Langan et al.

(10) Patent No.: US 6,838,209 B2
(45) Date of Patent: Jan. 4, 2005

(54) FLEXIBLE THIN BATTERY AND METHOD OF MANUFACTURING SAME

(75) Inventors: Richard Langan, Parma, OH (US); Frank Feddrix, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 197 days.

(21) Appl. No.: 09/960,079

(22) Filed: Sep. 21, 2001

(65) Prior Publication Data

US 2003/0059673 A1 Mar. 27, 2003

(51) Int. Cl.⁷ .................................................. H01M 2/02
(52) U.S. Cl. ...................... 429/178; 429/127; 429/163; 429/181
(58) Field of Search .................. 29/623.1; 429/127, 429/162, 163, 170, 176, 177, 178, 180, 181, 184

(56) References Cited

U.S. PATENT DOCUMENTS

| | | | |
|---|---|---|---|
| 4,059,718 A * | 11/1977 | Messing | 429/162 |
| 4,539,275 A | 9/1985 | Plasse | 429/152 |
| 4,670,664 A | 6/1987 | Hara | 307/150 |
| 4,996,128 A | 2/1991 | Aldecoa et al. | 429/153 |
| 5,580,679 A | 12/1996 | Tanaka | 429/185 |
| 5,631,101 A | 5/1997 | Amero, Jr. | 429/90 |
| 5,656,876 A | 8/1997 | Radley et al. | 307/150 |
| 5,705,294 A * | 1/1998 | Lake | 429/163 |
| 5,849,044 A | 12/1998 | Tuttle | 29/623.2 |
| 5,907,472 A | 5/1999 | Farahmandi et al. | 361/502 |
| 5,948,562 A | 9/1999 | Fulcher | 429/181 |
| 6,021,040 A | 2/2000 | Suzuki et al. | 361/514 |
| 6,113,658 A * | 9/2000 | Lane | 29/623.1 |
| 6,143,440 A * | 11/2000 | Volz et al. | 429/92 |
| 6,203,938 B1 | 3/2001 | Yoshida et al. | 429/94 |
| 6,225,778 B1 | 5/2001 | Hayama et al. | 320/112 |
| 6,387,566 B1 | 5/2002 | Chang et al. | 429/161 |

FOREIGN PATENT DOCUMENTS

| | | | |
|---|---|---|---|
| JP | 61051762 | 3/1986 | H01M/4/60 |
| JP | 1260755 | 10/1989 | H01M/2/02 |
| JP | 4106865 | 4/1992 | H01M/2/02 |

* cited by examiner

Primary Examiner—Franke L. Stinson
Assistant Examiner—Monique Wills
(74) Attorney, Agent, or Firm—Michael C. Pophal (57) ABSTRACT

A tabless battery housed in a sealed package is provided. The packaging material for the battery comprises a conductive material and a sealing material. At least a portion of the interior surface of the conductive material is exposed to form an internal contact between at least one electrode and the conductive material. At least a portion of the exterior surface of the conductive material is also exposed to form an external contact between the electrode and the device.

31 Claims, 6 Drawing Sheets

Fig. 11b

FLEXIBLE THIN BATTERY AND METHOD OF MANUFACTURING SAME

FIELD OF THE INVENTION

This invention relates to a flexible thin battery and a method for making such a battery. More specifically, this invention relates to a flexible thin battery wherein the electrode contacts are integral with the housing for the battery.

BACKGROUND OF THE INVENTION

Flexible thin batteries typically comprise contacts for carrying current between the battery electrodes and the device powered by the battery. These contacts are generally in the form of tabs, one or more discrete structures connected at one end to the electrode active material or the electrode substrate and extending from the interior of the battery to the exterior of the battery. Flexible thin batteries further generally comprise a housing or package sealed about the battery perimeter to enclose the electrodes, electrolyte and separator components. The package seal is typically formed by the application of heat or pressure or both to a sealable material to join the opposing surfaces of the package material together.

The tabs present a challenge in this type of construction for several reasons. Where the tab is not integral with the electrode structure, the tabs must be adhered to the electrode structure, usually by welding or adhesively joining the tab to the electrode structure to enable the flow of current. This is a complex process. Further, the tabs must not only contact the electrode structure but must also extend to the exterior of the battery beyond the package or housing to provide a contact with the device that will be powered by the battery. The extension of the tab from the interior to the exterior of the battery packaging can compromise the effectiveness of the package seal in the area where the tab must pass.

Therefore, there is a need for a flexible thin battery where contacts from the electrodes to the battery-powered device are provided without the need for tabs to pass through a seal area of the battery package.

SUMMARY OF THE INVENTION

A thin, preferably flexible battery is provided comprising an anode, a cathode and electrolyte contained within a sealed housing or package and contacts to provide current from the battery to the battery powered device. The contacts are integral with the material forming the battery package or housing, thereby avoiding the need for tabs to pass through a sealed area of the battery package or housing.

DESCRIPTION OF THE PREFERRED EMBODIMENT

Components of the thin flexible tabless battery 1 of the within invention include an anode 3, a cathode 5, a separator 7 and electrolyte contained within a flexible thin battery package, housing or enclosure 9. The anode 3 comprises electrochemically active material that can be combined with binders and other additives. Such material can be adhered to a substrate such as perforated or unperforated foil, foam, screen, mesh or other material as is known in the art. Similarly, the cathode 5 comprises electrochemically active material that can be combined with binders and other additives. Such material can also be adhered to a substrate such as perforated or unperforated foil, foam, screen, mesh or other material as is known in the art. While the preferred embodiment of the within invention utilizes planar anodes and cathodes, it will be appreciated that other electrode form factors can be utilized, such as wound electrodes, without departing from the scope of the within invention.

The material of the thin battery package or housing 9 of the within invention serves several functions. The material is sealable about its periphery to provide an effective enclosure for the battery components. The material also provides a barrier to prevent electrolyte vapor from escaping the battery, prevent the ingress of external gases and the ingress and egress of moisture, and, importantly, provide a conductive surface. The material is also durable enough to withstand environmental exposure. These properties are either integrated into a single material or are achieved through the use of an aggregate of materials.

One such suitable thin battery packaging material comprises a laminate of several discrete layers. The laminate comprises a conductive layer 13 sandwiched between an inner heat or pressure sealable polymer layer 11 and an outer protective polymer layer 15. Adhesives or tie layers, which bond the individual layers to one another, may also be present in the laminate. Laminates which are constructed of a metal foil surrounded by a protective polymer on one side and a heat or pressure sealable polyethylene or polypropylene on the opposite side are commonly available. Such laminates can be obtained from, for example, Pharma Center Shelbyville, Inc. of Shelbyville, Ky. under the product designation 97031, Dai Nippon printing Co., Ltd. of Tokyo, Japan under the product designation D-EL40E, and also, Sumitomo Electric Industries, Ltd. of Tokyo, Japan under the product designation L-NY-A1-TRPP-L. A laminate with an ethylene acrylic acid (EAA) heat-sealable layer is available from Pharma Center Shelbyville, Inc., product designation 95014. Alternatively, a laminate with an ethylene methacrylic or polyethylene methacrylic acid heat-sealable layer is made by Ludlow Coated Products of Homer, La. The appropriate laminate and associated sealing layer will be selected on the basis of, among other factors, the type of electrolyte to be used, as is known in the art. The impervious metallic foil layer can be any variety of metals such as, for example, aluminum, nickel, copper and stainless steel. The protective polymer layer is preferably a polyester or nylon, but other polymeric materials such as a polypropylene or a polyethylene could also be employed in this layer.

The anode-cathode electrode active materials of the battery of the within invention can be any of a well-known variety of appropriate electrochemical couples, such as a zinc-manganese dioxide, lithium-iron pyrite, lithium-manganese dioxide, lithium-sulfur and others known to those of skill in the art. Appropriate additives, including binders and conductors, as is known, can be included in the active material formulations without departing from the scope of the within invention. Electrolytes and separators will be selected based on a variety of factors, such as electrode form factor, cell chemistry and material stability, all as is commonly practiced by those of skill in the art.

In a preferred embodiment of the within invention, all or at least a portion of the anode 3 is in electrical contact with at least one surface of a first conductive layer 13 of the packaging or housing 9. All or at least a portion of the cathode 5 is in electrical contact with at least one surface of a second conductive layer 13 of the packaging or housing 9. The conductive layer 13 can be the same material for both anode and cathode, or a different conductive layer 13 material can be used for anode and cathode, depending on the chemistry and other cell attributes, as will be appreciated by those of skill in the art. For purposes of this application, the anode is in electrical contact with one surface of a conductive layer of the packaging when electric current is capable of passing between the anode and the conductive layer of the packaging, and the cathode is in electrical contact with one surface of a conductive layer of the packaging when electric current is capable of passing between the cathode and the conductive layer of the packaging. Such electrical contact can be provided by intimate and direct physical contact between the electrode and the conductive layer 13 of the packaging 9, or through the use of conductive intermediary materials (i.e. internal tabs or internal layers of material) extending between the electrode and an exposed interior surface of the conductive layer 13 of the packaging 9. Conductive intermediary material may be desirable to avoid direct corrosion reactions or other undesirable reactions between the various cell components.

The electrodes share an interfacial area, within which a separator 7 is typically interposed to prevent electrical connection between the electrodes and resulting internal shorting of the battery, as is known in the art. Separator materials can include gels, paper, polymers, porous films, woven materials and nonwoven materials, and will be selected based upon the cell chemistry and construction and operating parameters, as is known in the art. It will also be appreciated by one skilled in the art that a co-planar electrode arrangement wherein the interfacial area between electrodes includes a space sufficient to prevent the flow of electrons from one electrode to another can also be employed with the invention described herein, thereby obviating the need for a discrete separator component.

The battery components (anode, cathode, separator, electrolyte) are introduced within a partially sealed package. Electrical contact between at least one electrode and the internal contact surface is established either prior to or following the remaining sealing of the package about a predetermined perimeter of the two layers of packaging material 9 to form a perimeter seal area 17.

Figure 1:
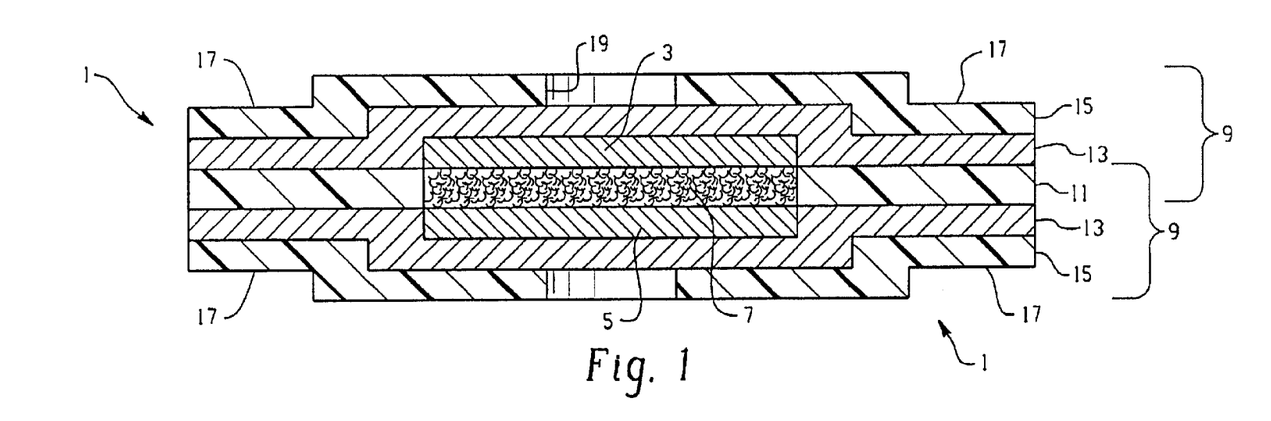
FIG. 1 is a cross sectional view of a battery of the within invention.
Figure 2:
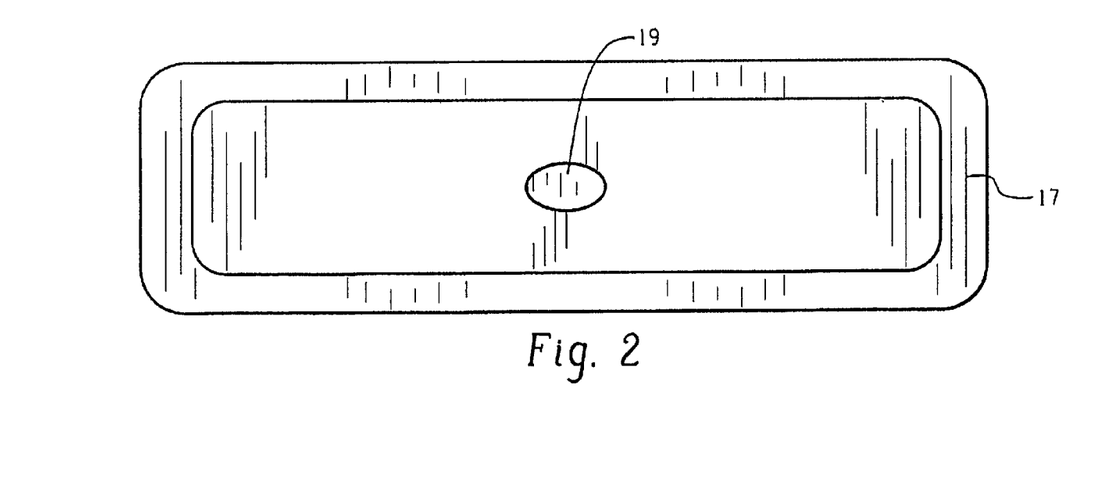
FIG. 2 is an alternate view of the battery of FIG. 1.

In one embodiment, illustrated in FIGS. 1 and 2, at least one contact of the flexible battery is formed of an opening 19 in the package 9 to expose to the external environment a portion of the surface of conductive layer 13 opposing the surface to which the electrode is in electrical contact. This surface of the conductive layer 13, a portion of which is exposed to the external environment, will be referred to herein as the external contact surface 13a. In this embodiment, the opening 19, or port, is preferably located in the central portion of the battery within the seal perimeter. While a round opening is illustrated, other shapes are conceivable as will be appreciated by one of skill in the art. A contact for both the anode and the cathode can be formed using this construction.

The surface of the conductive layer 13 opposing the external contact surface 13a is in electrical contact with an electrode of the flexible battery of the within invention. This surface of the conductive layer 13 that is in electrical contact with an electrode will be referred to herein as the internal contact surface 13b. In a preferred embodiment of the within invention, electrical contact is established between the electrode and the internal contact surface 13b by depositing the electrode active material directly onto the internal contact surface 13b of the conductive layer 13. Such deposition can occur by various printing techniques or roll coating methods or powder coating methods or vapor deposition methods or such other means of establishing intimate and direct physical contact between the electrode and the internal contact surface of the conductive layer 13. Electrical contact can also be established by adhering one or more sections of conductive material between an electrode and the internal conductive surface 13b to form internal tabs or internal conductive layers. Such would preferably be the case where, for example, an unfavorable reaction occurs when the electrode material comes into direct contact with the conductive layer 13.

Figures 3, 4A:
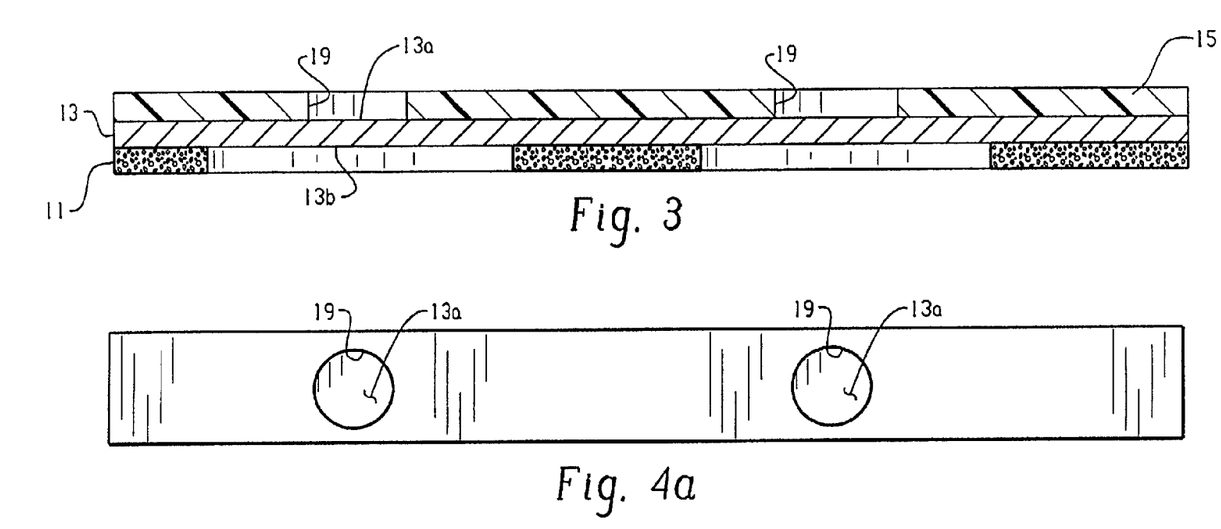
FIG. 3 is a cross sectional view of a web of material for use in manufacturing a battery package or housing in accordance with the within invention.
FIG. 4A is an alternate view of the web of FIG. 3.
Figure 4B:
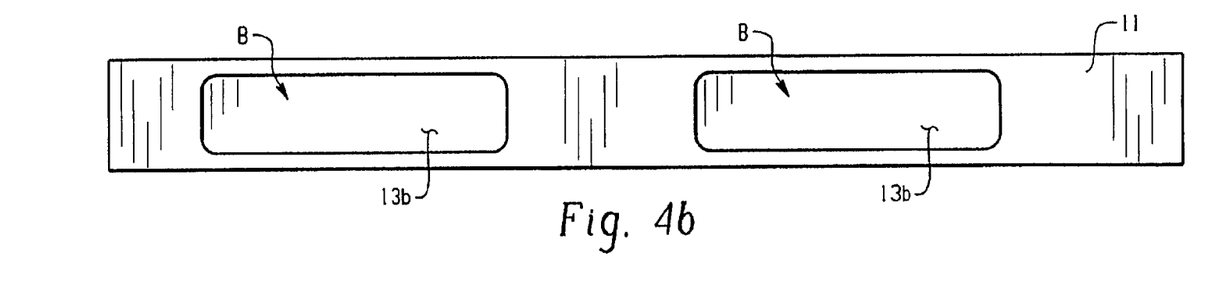
FIG. 4B is another alternate view of the web of FIG. 3.

In another aspect of the within invention, a method of continuous manufacture of a battery packaging material in accordance with the within invention can be practiced. As demonstrated in FIG. 3 and FIG. 4, a continuous web of the conductive layer 13 is selectively coated with a layer of a protective polymer 15 on one surface of the continuous web of conductive layer 13 and is selectively coated with a layer of heat or pressure sensitive adhesive 11 on the opposing surface of the continuous web of conductive layer 13. As used herein, selective coating means that a predetermined pattern of material is deposited upon a surface by any of a variety of methods known to one of skill in the art, including but not limited to various printing techniques or roll coating methods or powder coating methods or vapor deposition methods as discussed above. In FIG. 4a, the port 19, illustrated as a circle, is formed by selective coating of the protective polymer 15 onto one surface of the conductive layer 13. FIG. 4b illustrates the opposing surface of the conductive layer 13 web where an area suitable for the deposition of electrode material, designated as area B in FIG. 4b, is illustrated as a rectangular shape and is formed by selective coating of the heat or pressure sensitive adhesive material 11 onto that surface of the conductive layer web. Further processing of the web can include the deposition of the electrode active material onto the area formed for such purpose, as well as the introduction of other layers, such as separators or other intermediary layers, desired or required for the assembly of a cell or a portion thereof.

An alternate method of creating a patterned web can be practiced in accordance with the within invention by die cutting the various layers of material that will form the battery housing material, and then laminating the layers together. In this manner the internal and external contact surfaces of conductive layer 13 can be exposed where appropriate to create a cell contact. The housing material manufactured in this way can be further processed, such as for example depositing electrode active material onto the area formed for such purpose and introducing other cell components, such as a separator or other layers, that are desired or required for the assembly of the cell.

Figure 5:
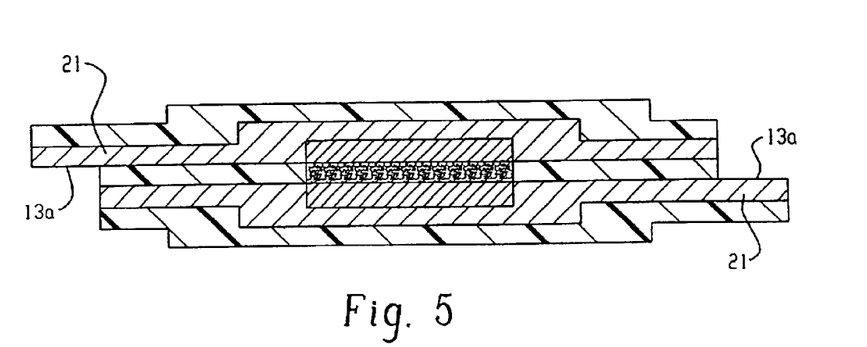
FIG. 5 is a cross sectional view of an alternate embodiment of a battery of the within invention.
Figure 6:
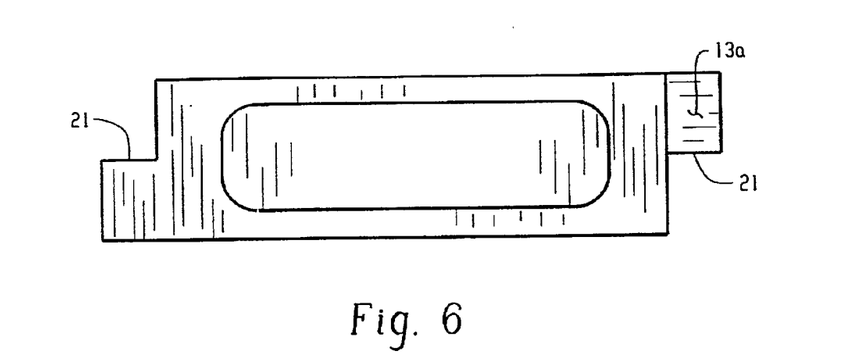
FIG. 6 is an alternate view of the battery of FIG. 5.

In an alternate embodiment, illustrated in FIG. 5 and FIG. 6, at least one external contact 21 of the flexible battery is formed by extending a portion of conductive layer 13 outside of the seal perimeter 17 of the battery and exposing to the external environment a portion of conductive layer 13 extending outside of the seal perimeter 17 of the battery. The exposed portion of conductive layer 13 that forms the external contact 21 preferably comprises a single surface 13a of conductive layer 13. That surface can, but need not be, the surface 13b of conductive layer 13 in electrical contact with the electrode within the seal perimeter 17. In this embodiment, illustrated in FIG. 5 and FIG. 6, the surface 13a exposed to the external environment to form an external contact 21 is also the surface 13b in electrical contact with the electrode material, enabling the underlying layer of the packaging material extending beyond the seal perimeter 17 to provide support for the external contact 21. Alternatively, the contact 21 can be formed by exposing at least a portion of the opposing surface of the conductive layer 13 (not shown), or by exposing at least a portion of both opposing surfaces of conductive layer 13 (not shown). A contact for both the anode and cathode can be achieved using any of these constructions, without departing from the scope of the within invention.

In another aspect of the within invention, a method of continuous manufacture of battery packaging material in accordance with the alternate embodiment disclosed above can be practiced. As demonstrated in FIG. 7 and FIG. 8, a continuous web of the conductive layer 13 is continuously coated with a layer of a protective polymer 15 on one surface of the continuous web of conductive layer 13 while the opposing surface is selectively coated with a layer of heat or pressure sensitive adhesive 11. The exposed external and internal contact surfaces 13a and 13b are formed by selective coating of the heat or pressure sensitive adhesive 11 to form an area available for deposition of electrode material (designated area B in FIG. 8) and a second area to be utilized as the external contact surface, designated area A in FIG. 8. This method has the added advantage of only requiring a selective coating process on a single surface of the web of packaging material, since the battery package of the within invention can then be formed by appropriate joining of sheets cut from either two webs or the same web. Further processing of the web can include the deposition of the electrode material onto the area formed for such purpose, as well as the introduction of other layers, such as separators or other intermediary layers desired or required for the assembly of a cell or a portion thereof.

Figure 7:
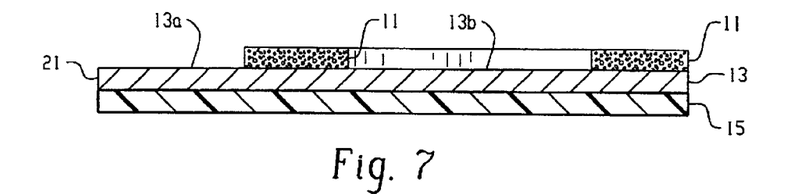
FIG. 7 is a cross sectional view of a web of material for use in manufacturing a battery package or housing in accordance with the within invention, as shown in FIG. 5 and FIG. 6.
Figure 8:
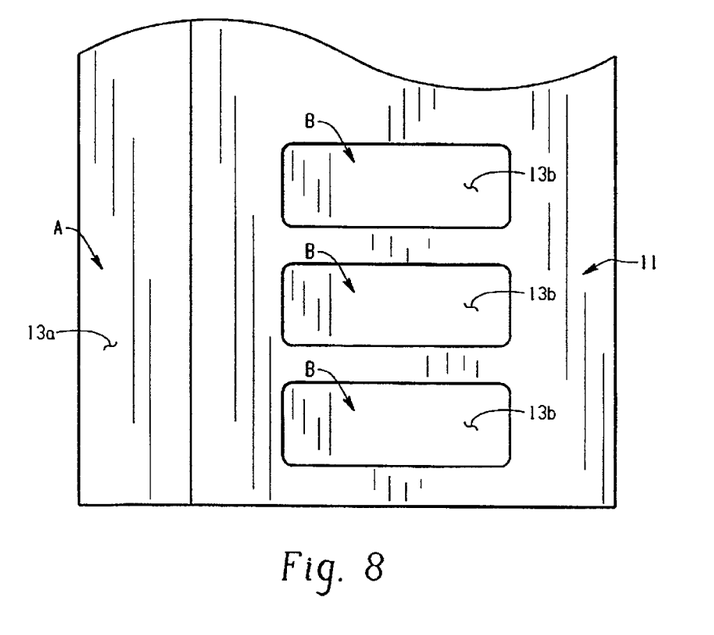
FIG. 8 is an alternate view of the web of FIG. 7.
Figure 9:
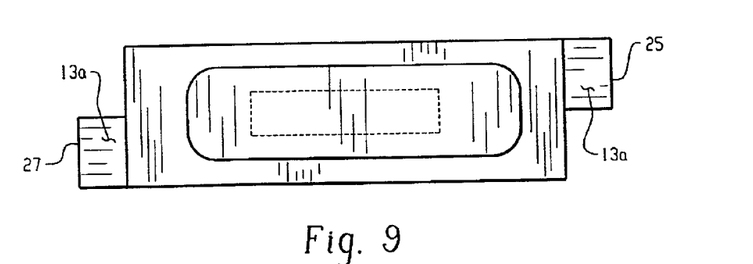
FIG. 9 is a top view of an embodiment of a battery of the within invention.
Figure 10:
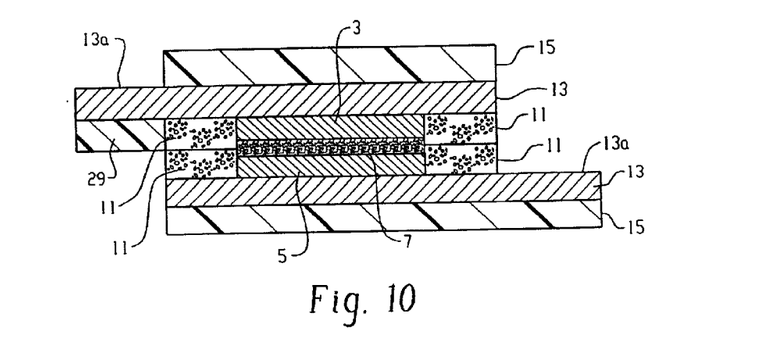
FIG. 10 is a cross sectional view of the battery of FIG. 9.
Figure 11A:
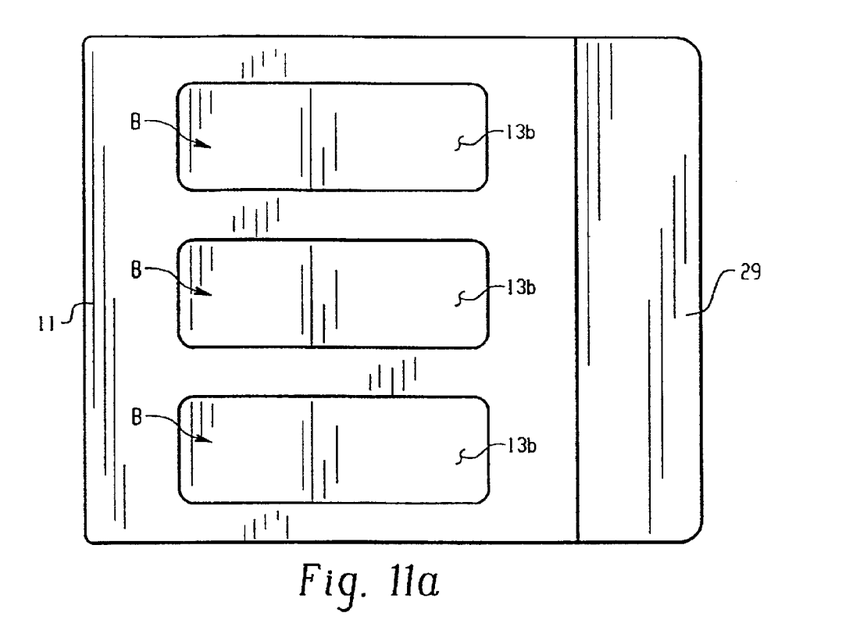
FIG. 11A is a top view of a web of material for use in manufacturing a battery package or housing in accordance with the within invention, as shown in FIG. 9 and FIG. 10.
Figure 11B:
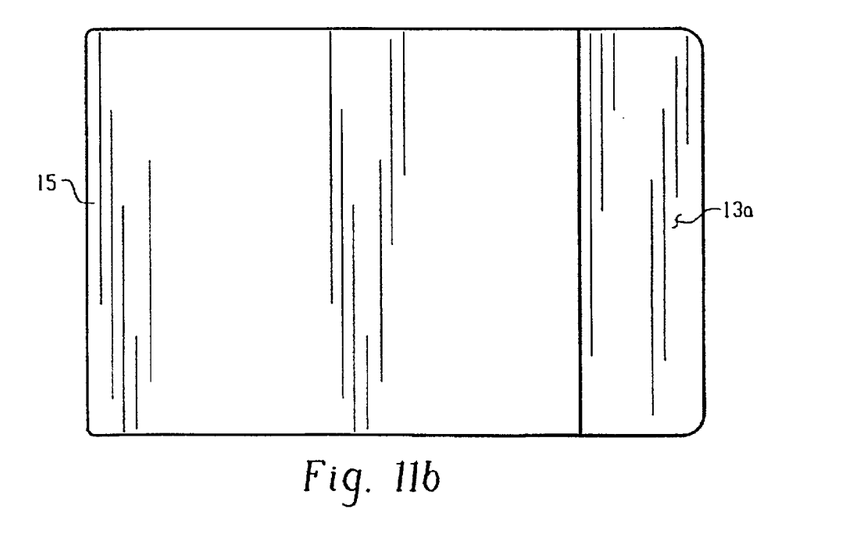
FIG. 11B is a bottom view of a web of material of FIG. 11A.

In yet another embodiment of the within invention, the anode and the cathode external contact surfaces of the cell are formed such that the contact surfaces each face the same direction, enabling alternate and potentially advantageous designs and locations for the device contacts coordinating with the cell contacts. In this embodiment, illustrated in FIG. 9 and FIG. 10, a first web of battery housing or packaging material is manufactured for one electrode external contact 25 and a second web is manufactured for the alternate electrode external contact 27. The first web can be as illustrated in FIG. 7 and FIG. 8, while the second web is illustrated in FIG. 11 and FIG. 12. In this embodiment, the external exposed contact surface 13b for the first web is, as in FIG. 7 and FIG. 8, the same surface as the internal contact surface 13a. However, in the second web, the external exposed contact surface 13b opposes the internal contact surface 13a for that web. Preferably, a protective material 29 is deposited on the surface of conductive layer 13 opposing the exposed external contact surface 13a.

The anode and cathode electrodes of the cell or battery of the within invention are preferably formed by adhering electrode active material directly to an exposed surface a conductive layer that also functions as the battery housing or packaging material. The electrode active material is adhered to the exposed conductive surface where a discontinuity in the overlayers has been established, either through the removal of overlayer material from a predetermined location or the selective coating of overlayer materials onto the surface or surfaces of the conductive material. The electrode active material can be in the form of a printable ink that is printed onto the conductive surface that has been exposed. Alternatively, the active material is in the form of a slurry that is roll coated onto the conductive surface that has been selectively exposed. Alternatively, the active material can be in a molten form and appropriately dispensed onto the conductive surface. Alternatively, the active material can be in the form of a paste applied to the conductive surface. Alternatively, the active material can be in the form of a solid foil that is adhered to the conductive surface by cold welding, ultrasonic welding, conductive adhesive and the like. Deposition of the active material onto the conductive internal surface of conductive layer 13 as discussed above may be followed by a compression step to promote adherance of the active material to the conductive surface, to increase the density of the active material, or to achieve other beneficial properties. The skilled artisan will appreciate that a wide variety of methods and materials can be used to form an electrically conductive contact between the electrode active material and the conductive surface that has been selectively exposed.

EXAMPLE 1

An electrode assembly was constructed consisting of a cathode, anode and separator. The cathode consisted of iron pyrite, conductor and binder combined into a slurry and intermittently roll coated onto both sides of an aluminum foil to form a planar sheet 37 millimeters×39.5 millimeters× 0.17 millimeters. The anode consisted of a lithium foil sheet 38 millimeters×38 millimeters×0.152 millimeters. An annealed nickel tab was cold welded at one end to the lithium foil. Celgard 2400 separator was then heat sealed around the combined lithium foil and nickel tab assembly, leaving a portion of the nickel tab protruding beyond the separator seal perimeter. The internal anode contact was formed by taking a sheet of laminate available from Pharma Center Shelbyville, product designation 95014, and selectively removing a portion of the heat seal layer to expose the inner surface of the aluminum layer. The protruding end of the nickel tab was placed in direct contact with this exposed aluminum surface to establish an internal anode contact. The internal cathode contact was formed by taking a second sheet of the laminate described above and selectively removing a portion of the heat seal layer to expose the inner surface of the aluminum layer. The cathode strip described above was then placed in direct contact with this exposed aluminum surface to establish an internal cathode contact. The external anode and cathode contacts were formed by selectively removing a portion of the protective polymer layer on each sheet to expose the opposing outer surface of the aluminum layer resulting in external contact ports.

The electrodes and separator and the two laminate sheets were joined together by a heat seal about a portion of the perimeter to form an open battery pouch. One gram of an appropriate nonaqueous electrolyte comprising 9.14 weight percent LiI (lithium iodide), 63.05 weight percent DIOX, 27.63 weight percent DME and 0.18 weight percent DMI was introduced into the pouch, where DIOX is 1,3-dioxolane, DME is 1,2-dimethoxyethane and DMI is 3,5-dimethylisoxazole. The pouch opening was then heat sealed. The external anode and cathode contacts were positioned within the seal perimeter of the pouch. Pressure was applied to the major surfaces of the pouch battery to assure good contact between all the cell components. The external contacts were then connected to a load and the battery was discharged at a continuous drain of 7 milliamps to 0.9 volts. A discharge efficiency of 66 percent was achieved without the necessity of passing conductive material from the interior of the pouch to the exterior of the pouch through the seal area.

EXAMPLE 2

An anode, cathode, separator and associated internal tabs were assembled as in Example 1. The internal contacts for the anode and the cathode were formed from two distinct sheets of laminate as in Example 1. An open pouch containing the battery components was formed by heat sealing the two separate sheets together and electrolyte was introduced into the open pouch as in Example 1. The opening in the pouch was then heat sealed. External anode and cathode contacts were formed on a portion of each laminate sheet extending beyond the pouch seal perimeter. Material from either the protective polymer layer or the heat sealable polymer layer or both were selectively removed to expose one or both surfaces of the conductive aluminum layer of the laminate. Pressure was applied to the major surfaces of the pouch battery to assure good contact between all the cell components. The external contacts were then connected to a load and the battery was discharged at a continuous drain of 7 milliamps to 0.9 volts. A discharge efficiency of 72 percent was achieved without the necessity of passing conductive material from the interior of the pouch to the exterior of the pouch through the seal area.

Although only a few embodiments of the present invention have been described above, it should be appreciated that many modifications can be made without departing from spirit and scope of the invention. For example, although the foregoing discussion of a thin preferably flexible battery focuses on a single anode coupled to a single cathode, the skilled artisan will appreciated that any number of anode and cathode couples, either in parallel or in series or both, can be incorporated within the battery without departing from the scope of the within invention.

What is claimed is:

1. A battery comprising an anode electrode, a cathode electrode, electrolyte, at least one external electrode contact and a battery enclosure sealed about at least a portion of the perimeter of the battery, said battery enclosure comprising electrically conductive material, said external electrode contact formed from said electrically conductive material, wherein the battery enclosure comprises a laminate comprising first, second and third layers, wherein the third layer comprises the electrically conductive material and is sandwiched between the first and second layers.

2. The battery of claim 1 wherein one of the first and second layers of the battery enclosure comprises a sealable material.

3. The battery of claim 2 wherein the other of the first and second layers of the battery enclosure comprises a protective polymer material.

4. The battery of claim 3 wherein the sealable material and the electrically conductive material and the protective polymer material are discrete materials.

5. A battery comprising an anode electrode, a cathode electrode, electrolyte, at least one external electrode contact and a battery enclosure sealed about at least a portion of the perimeter of the battery, said battery enclosure comprising electrically conductive material, said external electrode contact formed from said electrically conductive material, wherein the battery enclosure is a laminate, said laminate comprising a first layer of a sealable material, a second layer of a protective polymer material, and a layer of the electrically conductive material positioned between said first and second layers.

6. The battery of claim 5, wherein at least one of said first and second layers is discontinuous.

7. The battery of claim 6, wherein the first layer is discontinuous at a location within the seal perimeter of said battery to expose a first surface of said electrically conductive material, and wherein at least a portion of the exposed first surface is in electrical contact with an electrode.

8. The battery of claim 7, wherein the second layer is discontinuous at a location within the seal perimeter of said battery to expose a second surface of the electrically conductive material, at least a portion of the exposed second surface forming the external contact.

9. The battery of claim 7, wherein the first layer is also discontinuous at a location outside the seal perimeter of the battery to also expose the first surface of said electrically conductive material outside the seal perimeter, at least a portion of the exposed first surface outside the seal perimeter forming the external contact.

10. The battery of claim 7, wherein the second layer is discontinuous at a location outside the seal perimeter of said battery to expose a second surface of said electrically conductive material, at least a portion of the exposed second surface outside the seal perimeter forming the external contact.

11. The battery of claim 8, wherein the discontinuity in the first layer is formed by removal of a portion of the seal material from the first surface of said electrically conductive material and the discontinuity in the second layer is formed by removal of a portion of the protective polymer material from the second surface of said electrically conductive material.

12. The battery of claim 8, wherein the discontinuity in the first layer is formed by the selective deposition of seal material onto the first surface of said electrically conductive material and the discontinuity in the second layer is formed by selective deposition of protective polymer material onto the second surface of said electrically conductive material.

13. The battery of claim 9, wherein the discontinuities in the first layer are formed by the removal of seal material from the first surface of said electrically conductive material.

14. The battery of claim 9, wherein the discontinuities in the first layer are formed by the selective deposition of seal material onto the first surface of said electrically conductive material.

15. The battery of claim 10, wherein the discontinuity in the first layer is formed by removal of a portion of the seal material from the first surface of said electrically conductive material and the discontinuity in the second layer is formed by removal of a portion of the protective polymer material from the second surface of said electrically conductive material.

16. The battery of claim 10, wherein the discontinuity in the first layer is formed by the selective deposition of seal material onto the first surface of said electrically conductive material and the discontinuity in the second layer is formed by selective deposition of protective polymer material onto the second surface of said electrically conductive material.

17. The battery of claim 12, wherein the selective deposition of the seal material and the selective deposition of the protective polymer material is achieved by printing the seal material onto the first surface of the electrically conductive layer and the protective polymer material onto the second surface of the electrically conductive layer.

18. The battery of claim 14, wherein the selective deposition of the seal material is achieved by printing the seal material onto the first surface of the electrically conductive layer.

19. The battery of claim 16, wherein the selective deposition of the seal material and the selective deposition of the protective polymer material is achieved by printing the seal material onto the first surface of the electrically conductive layer and the protective polymer material onto the second surface of the electrically conductive layer.

20. The battery of claim 7, wherein electrical contact between the electrode and the surface of the electrically conductive material is achieved by printing active electrode material onto the exposed surface of the electrically conductive layer.

21. A method for assembling a battery, comprising the steps of providing a packaging material comprising an electrically conductive material and a sealable material, exposing a portion of a first surface of the conductive material; exposing a portion of a second surface of the conductive material, enclosing an anode, a cathode and an electrolyte within the packaging material, providing an electrical contact between an electrode and the first surface, and sealing the packaging material about a perimeter such that said second surface is external to the battery.

22. The method of claim 21, wherein said step of exposing a portion of a first and second surface of the conductive material comprises the removal of an overlayer material from the surfaces of the conductive material.

23. The method of claim 21, wherein said step of exposing a portion of a first and second surface of the conductive material comprises the selective coating of overlayer material onto the surfaces of the conductive material.

24. The battery of claim 1, wherein the battery is a flexible thin battery.

25. The battery of claim 1, wherein the electrically conductive material serves as the external electrode contact to avoid a need for tabs to pass through a sealed area of the battery.

26. A flexible thin battery comprising an anode electrode, a cathode electrode, electrolyte, at least one external electrode contact and a battery enclosure sealed about at least a portion of the perimeter of the battery, said battery enclosure comprising electrically conductive material, said external electrode contact formed from said electrically conductive material, wherein the battery enclosure is a laminate, said laminate comprising a first layer of sealable material, a second layer of protective polymer material, and a layer of the electrically conductive material positioned between said first and second layers.

27. The battery of claim 26, wherein the first layer is discontinuous at a location within the seal perimeter of said battery to expose first and second surfaces of said electrically conductive material, wherein at least a portion of the exposed first surface is in electrical contact with an electrode, and at least a portion of the exposed second surface forming the external electrode.

28. The battery of claim 26, wherein the first layer is discontinuous at a location outside the seal perimeter of the battery to expose a first surface of said electrically conductive material outside the seal perimeter, at least a portion of the exposed first surface outside the seal perimeter forming the external contact.

29. The battery of claim 26, wherein the second layer is discontinuous at a location outside the seal perimeter of said battery to expose a second surface of said electrically conductive material, at least a portion of the exposed second surface outside the seal perimeter forming the external contact.

30. The battery of claim 26, wherein the electrically conductive material serves as the external electrode contact to avoid a need for tabs to pass through a sealed area of the battery.

31. A battery comprising an anode electrode, a cathode electrode, electrolyte, at least one external electrode contact and a battery enclosure sealed about at least a portion of the perimeter of the battery, said battery enclosure comprising electrically conductive material, said external electrode contact formed from said electrically conductive material, wherein the electrically conductive material forms an external contact formed by extending a portion of the electrically conductive material outside of a perimeter seal area.

* * * * *